United States Patent [19]

Schulien et al.

[11] 3,951,476
[45] Apr. 20, 1976

[54] CENTRIFUGALLY FLOW CONTROLLED LUBRICATED BEARING

[75] Inventors: Howard E. Schulien, Montville; William H. Ficken, Berkeley Heights, both of N.J.

[73] Assignee: The Bendix Corporation, Teterboro, N.J.

[22] Filed: Sept. 27, 1974

[21] Appl. No.: 510,106

[52] U.S. Cl. ............................... 308/114; 184/31; 184/43; 184/63; 184/70; 184/77; 308/96; 308/112; 307/123; 308/187
[51] Int. Cl.² .................. F16C 1/24; F16C 33/66; F16N 9/02; F16N 29/02
[58] Field of Search ............ 184/12, 31, 36, 43, 184/70, 77, 6.16, 6.2, 6.26, 10, 63; 308/78, 109, 110, 114, 116, 123, 187, 96, 112

[56] References Cited
UNITED STATES PATENTS

| | | | |
|---|---|---|---|
| 1,551,366 | 8/1925 | Carlson | 184/70 X |
| 2,272,554 | 2/1942 | Gilbert | 308/187 |
| 2,449,574 | 9/1948 | Wilcock | 308/187 |
| 2,712,478 | 7/1955 | Carroll | 308/187 X |

OTHER PUBLICATIONS

AEC-NASA Tech. Brief, July 1968, (68-10261), 2 pp., 308-187.

Primary Examiner—Albert J. Makay
Assistant Examiner—Howard Beltran
Attorney, Agent, or Firm—Anthony F. Cuoco; S. H. Hartz

[57] ABSTRACT

A dynamic bearing lubricant reservoir for permitting a continuous and centrifugally metered flow of lubricant to the active part of the bearing only when the bearing is in the dynamic state i.e. operating, for extending the life of the bearing without affecting its torque.

4 Claims, 3 Drawing Figures

CENTRIFUGALLY FLOW CONTROLLED LUBRICATED BEARING

BACKGROUND OF THE INVENTION

1. Field of the Invention

This invention relates generally to bearing lubricating devices and particularly to a device for providing a controlled or metered lubricant flow to a bearing. More particularly, this device relates to a device of the type described wherein the lubricant is applied to the bearing only when the bearing is operating.

2. Description of the Prior Art

In aerospace applications where low power and long bearing life is mandatory, particular bearing lubrication problems are presented. The flow of lubricant to the bearing must be metered or controlled for extending the life of the bearing without substantially affecting its torque. Thermal conditions must be compensated for in that lubricant flow diminishes at low temperatures and increases at high temperatures. Prior art devices for accomplishing these purposes include various types of lubricant transfer means. However, these devices have resulted in an increase in power due to the wiping action resulting therefrom and the viscous shear caused by an excess of lubricant applied to the bearing.

SUMMARY OF THE INVENTION

The present invention contemplates a lubricant reservoir arranged with the bearing and its associated wheel or shaft and rotating at shaft speed. The reservoir is filled with lubricant of desired viscosity, and which lubricant is hurled through a discharge channel to the transfer edge of the reservoir due to the centrifugal force generated upon rotation. The transfer edge of the reservoir has a lip which receives the lubricant and directs it to the active part of the bearing. Control means are interposed in the channel for metering the lubricant flow therethrough in response to the centrifugal force.

One object of this invention is to provide a dynamic bearing lubricant reservoir for applying a controlled or metered amount of lubricant to the bearing.

Another object of this invention is to accomplish the above without substantially affecting the torque of the bearing.

Another object of this invention is to provide a device of the type described which is useful with lubricants of various viscosities in consideration of thermal gradients which may occur.

Another object of this invention is to provide a device of the type described including means for directing the lubricant to the active part of the bearing for maximum lubricant utility.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
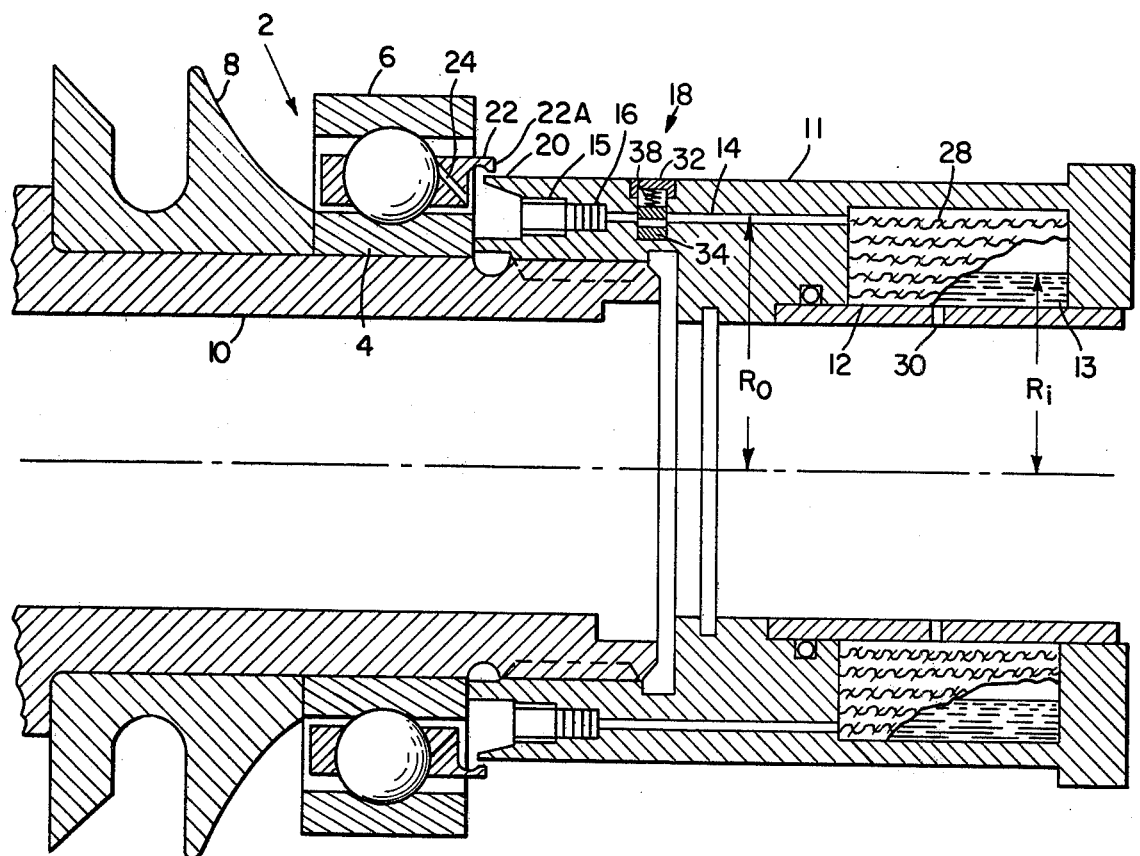
FIG. 1 is a partially sectioned diagrammatic side view of a bearing arrangement including the dynamic lubricant reservoir according to the invention.

With reference first to FIG. 1, a bearing designated generally by the numeral 2, which is shown as a ball bearing for purposes of illustration, has an outer face 6 and an inner race 4 which butts against a shoulder 8 of a shaft 10. A nut 11 which may be suitably threated or pressed on to shaft 10 locks bearing 2 against shoulder 8, with bearing 2 being suitably pressed on to shaft 10 so as to rotate therewith as is well known in the art.

Figure 2:
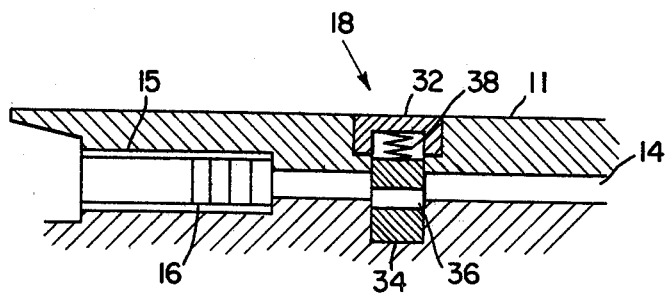
FIG. 2 is a partially sectioned diagrammatic representation of a portion of the bearing lubricant reservoir shown in FIG. 1, and illustrating the lubricant control means according to the invention.
Figure 3:
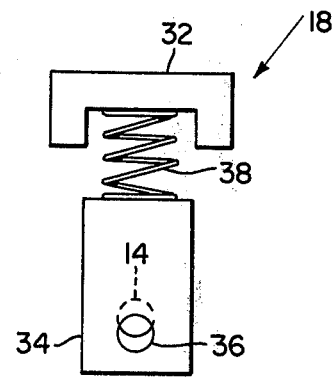
FIG. 3 is a diagrammatic end view showing the lubricant control means according to the invention.

Nut 11 contains a lubricant reservoir 12, and which reservoir 12 is filled with suitable lubricant 13 which may be an oil or grease of a desired viscosity. A channel 14 leads from reservoir 12 and terminates in an orifice 15. Orifice 15 is restricted by restrictors 16 which may be millipore filters or the like and are calibrated for permitting a predetermined flow of lubricant through the orifice. Lubricant flow control means 18, to be fully described with reference to FIGS. 2 and 3, is disposed in channel 14 between reservoir 12 and restrictors 16.

Lubricant 13 passes from reservoir 12 through channel 14, lubricant flow control means 18 and restrictors 16 to a transfer edge 20 of nut 11. Upon rotation of shaft 10, and hence rotation of reservoir 12, the lubricant is hurled to bearing retainer 22 and therefrom to a plurality of channels designated as 24 to outer race 6 of bearing 2 for providing the necessary lubricating effect. Retainer 22 has a lip 22A which retains lubricant so hurled from reservoir 12 and is arranged to direct lubricant 13 through channel 24 to bearing outer race 6 contact angle and/or retainer ball pockets.

If the device is to operate under a controlled vacuum rolled felt designated in FIG. 1 by the numeral 28 is packed into reservoir 12 to allow air evacuation through an orifice 30 without leakage of oil in a predetermined gravitational field as will now be understood.

Upon rotation of shaft 10 the centrifugal force generated creates a pressure on lubricant 13 within reservoir 12 as follows:

$$P = \frac{\rho}{2g}(R_o^2 - R_i^2)\omega^2, \tag{1}$$

where:
 $P$ = reservoir outlet pressure (PSI)
 $\rho$ = lubricant density (lbs/in$^3$)
 $g$ = 386 (in/sec$^2$)
 $R_O$ = outlet radius (FIG. 1) (in.)
 $R_i$ = inner radius (FIG. 1) (in.) to lubricant level
 $\omega$ = speed of shaft 10 (rad/sec.)

Using millipore restrictors 16, the lubricant flow rate is proportional to the pressure. The time to deplete the incremental volume of reservoir lubricant is as follows:

$$T = dV \tag{2}$$

where:
 $T$ = time
 $V$ = volume
 $d$ = flow rate

The flow rate diminishes during this time because of the decrease in pressure with the decrease in lubricant level within reservoir 12 as will now be understood.

Lubricant 13 can be metered to bearing 2 through the operation of lubricant control means 18 best shown in FIGS. 2 and 3. Control means 18 includes a housing 32 fixedly supported within nut 11 and an orifice plate 34 supported within nut 11 so as to be longitudinally moveable and carrying a suitable orifice 36. A biasing spring 38 is secured to orifice plate 34 and housing 32.

Orifice 36 may be initially out of alignment with channel 14 as shown in FIGS. 2 and 3. The increase or decrease in centrifugal force commensurate with the rotational speed of shaft 10 adjusts the alignment of orifice 36 and channel 14 through the compression or expansion of spring 38 to meter the flow of lubricant through the channel 14. For example, the design as shown in FIGS. 2 and 5 may be such that an increase in centrifugal force caused by an increase in the rotational speed of shaft 10 compresses spring 38 so as to only partially restrict channel 14 thus allowing increased lubricant flow while a decrease in centrifugal force further restricts the channel to decrease the lubricant flow.

Although lubricant reservoir 12 is shown as an integral part of the bearing and shaft assembly the reservoir can be separate from the bearing or bearing shaft, the same being a matter of design choice. Likewise, although the device has been described for an inner race running ball bearing the same principle of operation applies to an outer race running ball bearing and to other type bearings as well.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for lubricating a rotating member, comprising:
   means arranged with the rotating member for rotating therewith;
   said means including a lubricant reservoir and means communicating with the reservoir and the rotating member for carrying lubricant to the rotating member through the centrifugal force generated upon rotation of the reservoir carrying means therewith;
   said lubricant carrying means including a channel leading from the reservoir and terminating in a lubricant transfer member disposed near the rotating member for transferring lubricant to said member; and
   means arranged with the channel and responsive to the centrifugal force for metering the lubricant flow therethrough to the rotating member, said means including a plate disposed in the channel and carrying an aperture, said plate arranged for transverse displacement relative to the channel, means for biasing the plate so that the aperture carried thereby is in a predetermined alignment relation with the channel, and said biasing means being responsive to the centrifugal force generated by the rotation for transversely displacing the plate to adjust the predetermined alignment relation for metering the lubricant flow through the channel to the rotating member.

2. Apparatus as described by claim 1, including:
   restrictor means disposed in the channel for restricting the lubricant flow therethrough from the reservoir to the lubricant transfer member.

3. Apparatus as described by claim 1, wherein the rotating member includes:
   means arranged with the transfer member for retaining lubricant transferred by said member; and
   a plurality of channels arranged with the retaining means and leading to a predetermined area of the rotating means, said retaining means directing lubricant retained thereby through the plurality of channels to the predetermined rotating member area.

4. Bearing lubricating apparatus, comprising:
   a bearing arranged with a rotatable member;
   means for locking the bearing to the rotatable member and rotatable therewith;
   a lubricant reservoir internal to the locking means and a lubricant flow channel leading from the reservoir and terminating in a lubricant discharge orifice near the bearing;
   means arranged in the channel and responsive to the centrifugal force effected upon rotation of the rotatable member and the locking means therewith to meter the lubricant flow therethrough, said means including a plate disposed in the channel and carrying an aperture, said plate arranged for transverse displacement relative to the channel, means for biasing the plate so that the aperture carried thereby is in a predetermined alignment relation with the channel, and said biasing means being responsive to the centrifugal force generated by the rotation for transversely displacing the plate to adjust the predetermined alignment relation for metering the lubricant flow through the channel to the rotating member,
   restricting means arranged in the discharge orifice for restricting the flow of lubricant therethrough; and
   the lubricant being carried from the reservoir and through the partially blocked channel, metering means and discharge orifice restricting means to the bearing by the centrifugal force.

* * * * *